United States Patent
Tacke et al.

[11] 3,944,326
[45] Mar. 16, 1976

[54] WAVEGUIDE

[75] Inventors: Maurus Tacke, Ratingen; Reinhard Ulrich, Leonberg-Silberberg, both of Germany

[73] Assignee: Max-Planck-Gesellschaft zur Forderung der Wissenschaften e.V., Gottingen, Germany

[22] Filed: Oct. 11, 1973

[21] Appl. No.: 405,323

[30] Foreign Application Priority Data
Oct. 17, 1972   Germany............................ 2250901

[52] U.S. Cl......................... 350/96 WG; 333/95 S
[51] Int. Cl.².... G02B 5/14; G02B 5/15; H01P 3/10
[58] Field of Search..... 333/95 S, 95 R, 31 R, 31 A; 350/96 WG

[56] References Cited
UNITED STATES PATENTS

| | | | |
|---|---|---|---|
| 2,774,005 | 12/1956 | Kazan | 333/31 A |
| 2,932,761 | 4/1960 | Epsztein | 313/31 A |
| 2,945,227 | 7/1960 | Broussaud | 343/895 |
| 2,966,644 | 12/1960 | Hafner | 333/95 S |
| 3,077,569 | 2/1963 | Ikrath | 333/95 R |
| 3,219,954 | 11/1965 | Rutelli | 333/95 S |
| 3,231,780 | 1/1966 | Feinstein | 333/31 A |
| 3,586,872 | 6/1971 | Tien | 333/95 S |
| 3,694,055 | 9/1972 | Bergman, Jr. et al. | 350/96 WG |

FOREIGN PATENTS OR APPLICATIONS

| | | | |
|---|---|---|---|
| 890,924 | 2/1944 | France | 333/95 R |

OTHER PUBLICATIONS

Ziman, J. M. "Electrons & Phonons," Oxford at the Clarendon Press, 1960, pp. 22–27.
Ziman, J. M. "Principles of the Theory of Solids," Cambridge at the University Press, 1972 pp. 6–15.
Marcuvitz, N., "Waveguide Handbook," McGraw–Hill, 1951, Vol. 10 of Radiation Lab. Series pp. 84–89.
Brown, J., "Artificial Dielectrics Having Refractive Indices Less Than Unity," Proc. IEE Vol. 100 PT IV, 1953, pp. 52–57.
Ash, E. A., "Tapered Grating Reflectors," IBM Disclosure Bulletin Vol. 13, No. 5, 10–1970, pp. 1204–1205.
Fox, A. J. "The Grating Guide–A Component for Integrated Optics Proc. IEEE 5–1974, pp. 644–645.
White et al., "Multiple Ladder Circuits for Millimeter Wavelength Traveling-Wave Tubes," Proc. of Symp. on Millimeter Waves, 1959, TK 7801 S84, pp. 367–377, 391–402.
Brown, J., "Artificial Dielectrics Having Refractive Indices Less Than Unity," Proc. IEE, Vol. 100, Pt. IV, 1953 pp. 51, 58.

Primary Examiner—Alfred E. Smith
Assistant Examiner—Wm. H. Punter
Attorney, Agent, or Firm—Jerry Cohen; Charles Hieken

[57] ABSTRACT

A waveguide for submillimeter and infrared wavelength range electromagnetic radiation comprises a metal grating with a grating constant criterion:

$$\left( \frac{1}{g_x^2} + \frac{1}{g_y^2} \right)$$

being greater than $(2/\lambda)^2$,
where $\lambda$ is wavelength of an electromagnetic wave propagating freely in the surrounding medium and $g_x$, $g_y$ are grating constants in orthogonal directions. The constants $g_x$, $g_y$ may be equal to each other or different.

13 Claims, 6 Drawing Figures

WAVEGUIDE

BACKGROUND OF THE INVENTION

The present invention relates to waveguides for electromagnetic waves in the submillimeter and infrared range.

Practical waveguides are unavailable in the range of short submillimeter waves and infrared waves.

It is an important object of the invention to provide a waveguide for submillimeter and infrared wavelength ranges.

It is a further object of the invention to provide means for conducting energy from a source to a nearby consumer.

It is a further object of the invention to provide tailoring of propagation velocity consistent with one or more of the preceding objects.

It is a further object of the invention to provide phase velocity adjustment consistent with one or more of the preceding objects.

It is a further object of the invention to provide for measurement of surface impedance of solids consistent with one or more of the preceding objects.

SUMMARY OF THE INVENTION

Waveguides are characterized according to the invention by an at least singly-periodic grating made of electrically conducting material with at least a grating constant $$\left(\frac{1}{g_x^2} + \frac{1}{g_y^2}\right) > \left(\frac{2}{\lambda}\right)^2$$

where $\lambda$ is the wavelength of an electromagnetic wave of the radiated frequency propagating freely in the surrounding medium and $g_x$, $g_y$ are not necessarily different grating constants of the grating.

The waveguide may be combined with a prism(s) for coupling in and/or out. Each prism has one face opposing the waveguide grating and being parallel thereto, i.e. perpendicular to the shortest line therebetween, and a second face opposing a source or receiver of radiation in non-parallel relation. The grating is preferably rotatable about an axis perpendicular to the prism face opposed thereto.

These and other objects, features and advantages of the invention will be apparent from the following detailed description with reference therein to the accompanying drawings the figures of which:

DETAILED DESCRIPTION OF PREFERRED EMBODIMENTS

Figure 1:
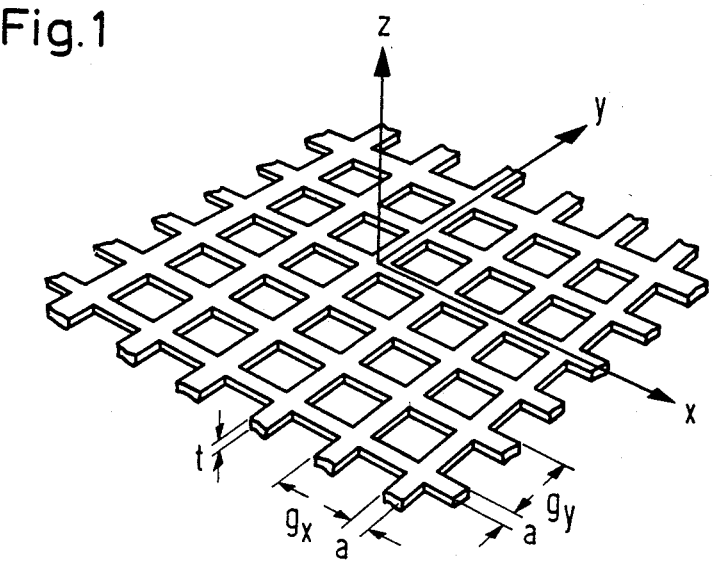
FIG. 1 is a perspective view of a portion of a waveguide according to the invention.

FIG. 1 shows a metallic crossed grating made of a sheet metal of thickness $t$ which is perforated in a regular two-dimensional pattern. The grating constants of this pattern are $g_x$ and $g_y$ in the $x$- and $y$-direction. In the simplest case, the two grating constants are equal, $g_x = g_y = g$, and the grating has quadratic symmetry. Gratings with grating constants $g = 50, 100, 141$ and $169$ $\mu$m were investigated. The thickness $t$ was approximately 7 $\mu$m in all instances. The ratio $a/g$ of bar width $a$ to grating constant was approximately 0.25.

In this "grating," the radiation of wavelength $\lambda = 337$ $\mu$m from an HCN laser was coupled in, conducted, coupled out again and then detected by a detector. The propagation occurs in the form of a TM polarized wave bound closely to the line. The propagation can occur in any direction of the $xy$-plane, i.e., the waveguide is two-dimensional. The phase velocity of the propagation exhibits characteristic dependences on frequency and direction. Ohmic losses in the metal of the grating cause the wave propagation to be damped. The damping losses were determined to be of the order of magnitude of 2 dB/cm.

APPLICATIONS

The waveguides according to the invention are intended preferably for the following applications:

a. Submillimeter microwave engineering

A direct application exists here in the conduction of electromagnetic energy from a source to a nearby consumer, e.g. from an antenna to the mixer stage of a superheterodyne receiver. By suitable choice of the grating dimensions $g_x$, $g_y$, $a$, $t$ relative to the wavelength of the waves to be conducted, it is possible to adapt the phase velocity of the waves on the waveguide to given requirements within broad limits. Thus, waveguides can perhaps be made for particularly large or particularly small phase velocities, which here is synonymous with waves bound particularly loosely or particularly tightly to the waveguide. Waveguides of such a type come into consideration in various combinations for amplitude filters, phase filters and time-delay filters.

b. Nonlinear optics and travelling wave modulators

In these applications, several waves of different frequency interact with each other. For the application of the invention, at least one of these waves must lie in the submillimeter or infrared range. The others can lie in the visible or near infrared, for example. For a good efficiency of the interaction it is necessary to make the phase velocities of these three waves equal to each other within narrow tolerances. Here a waveguide according to the invention offers advantages as an artificial propagation medium in comparison with natural propagation media (e.g., crystals), since in a waveguide according to the invention the propagation velocity can be adjusted by the choice of its dimensions. The interacting wave on the waveguide need not be the fundamental wave, but rather can also be one of the infinitely many higher partial waves that can arise on the waveguide due to its periodicity. These waves have lower phase velocities than the fundamental wave. Both the forward and backward types exist, i.e., their phase and group velocities can have equal or opposite directions. Furthermore, there also exist partial waves in which these velocities are not collinear. This gives rise to diverse possibilities for solving the problem of phase matching. Especially important is the possibility of effecting fine corrections in the phase velocity by rotating the grating as a whole in its plane. As a consequence of the directional dispersion, the phase velocity then changes continuously. A variation of ±5% could be achieved in the embodiments.

c. Measurement technique

With a waveguide according to the invention it is possible to measure the surface impedance of solids, e.g., of semiconductors and metals, at submillimeter and infrared frequencies. To make the measurement the surface to be investigated is applied parallel to the line at a small distance. The real and imaginary parts of the unknown surface impedance can be determined from the resulting changes of phase velocity and damping. In particular, this method permits a rapid noncontacting measurement of very small impedances such as are exhibited, for example, by many epitaxially applied semiconductor films.

THEORY

The field of an electromagnetic wave on a doubly periodic grating according to FIG. 1 in vacuum can be described as the superposition of a doubly infinite number of partial waves:

$$V(x,y,z,t) = \sum_{\mu=-\infty}^{+\infty} \sum_{\nu=-\infty}^{+\infty} a_{\mu\nu} F_{\mu\nu}(z) \exp(i\vec{\beta}_{\mu\nu} \cdot \vec{r} - i\omega t) \quad (1)$$

where V is any one of the field components. The integers $\mu$ and $\nu$ distinguish the partial waves, $a_{\mu\nu}$ are their amplitudes, $F_{\mu\nu}(z)$ are their field distributions in the z-direction, $r = \{x,y\}$ is the position vector in the plane of the line, and $\omega$ is the angular frequency. The propagation vector $\vec{\beta}_{\mu\nu}$ of the $(\mu,\nu)$th partial wave is given by $$\vec{\beta}_{\mu\nu} = \vec{\beta}_{00} + \mu\vec{q}_x + \nu\vec{q}_y \quad (2)$$

where $\vec{q}_x = \{2\pi/g_x, 0\}$ and $\vec{q}_y = \{0, 2\pi/g_y\}$ are the basis vectors of the reciprocal lattice, and $\vec{\beta}_{00} = \{\beta_{00,x}, \beta_{00,y}\}$ is the smallest in magnitude of the series (2) of all possible propagation vectors.

The phase velocity of the $(\mu,\nu)$th partial wave is $$v_\mu^{(ph)} = \frac{c}{|\vec{\beta}_{\mu\nu}|} \quad (3)$$

where c is the velocity of light. According to Eq. (3), the fundamental wave $\vec{\beta}_{00}$ travels fastest. The transverse field distribution of the partial waves is $$F_{\mu\nu}(z) = \pm \exp[-|z|(\beta^2_{\mu\nu} - k^2)^{1/2}] \quad (4)$$

where $k = \omega/c$ is the propagation constant of vacuum. It follows from Eqs. (2) and (4) that all partial waves are bound to the line if $$|\vec{\beta}_{00}| > k.$$

In order that this condition be fulfillable, $$(g_x^{-2} + g_y^{-2}) > (2/\lambda)^2 \quad (5)$$

must hold in any case. Thus, this condition is necessary in order to conduct waves of vacuum wavelength $\lambda$ in a nonradiating manner on the grating. In the case of a grating which is only singly periodic ($g_y \to \infty$), the condition (5) then reads $g < \lambda/2$.

It is evident from Eq. (4) that the field of the higher partial waves decays rapidly with increasing distance from the grating. Such waves are said to be "tightly" bound to the grating. The fundamental wave $\vec{\beta}_{00}$ is most loosely bound, i.e. its field extends furthest from the grating into space.

A wave guidance of the type described here is still possible even when the condition (5) is violated. But then at least one of the partial waves is no longer bound to the grating and the line extracts energy by radiation. This generally means a greatly increased damping.

DISPERSION

Figure 2:
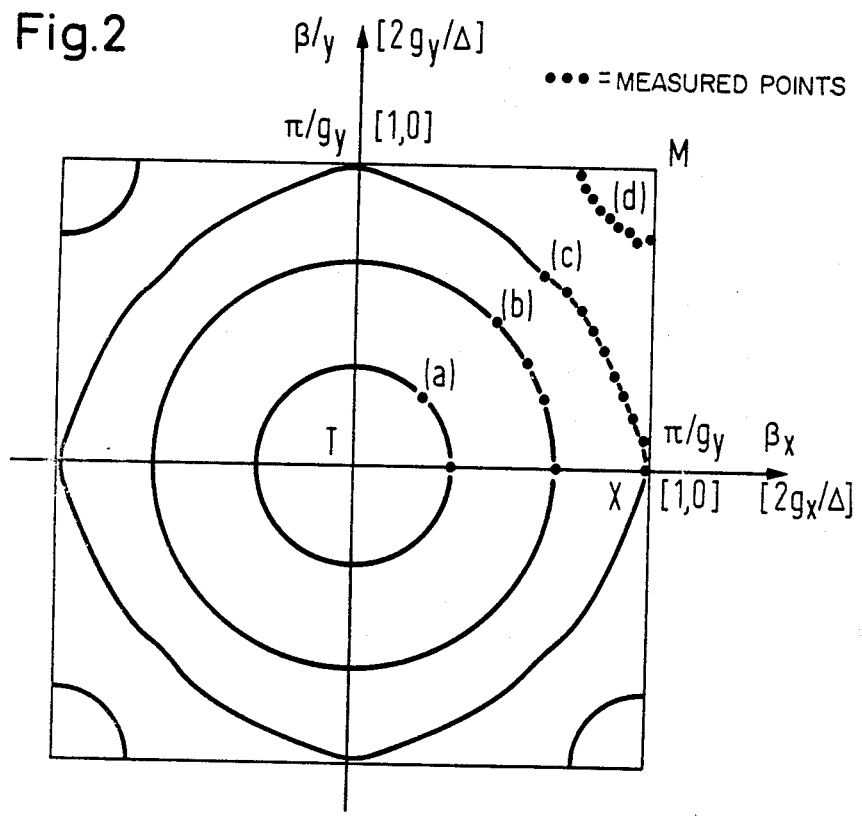
FIGS. 2 and 3 are two graphical representations of the same dispersion data (normalized) for electromagnetic radiation of $337 \times 10^{-6}$ m wavelength propagated via the FIG. 1 waveguide.
Figure 3:
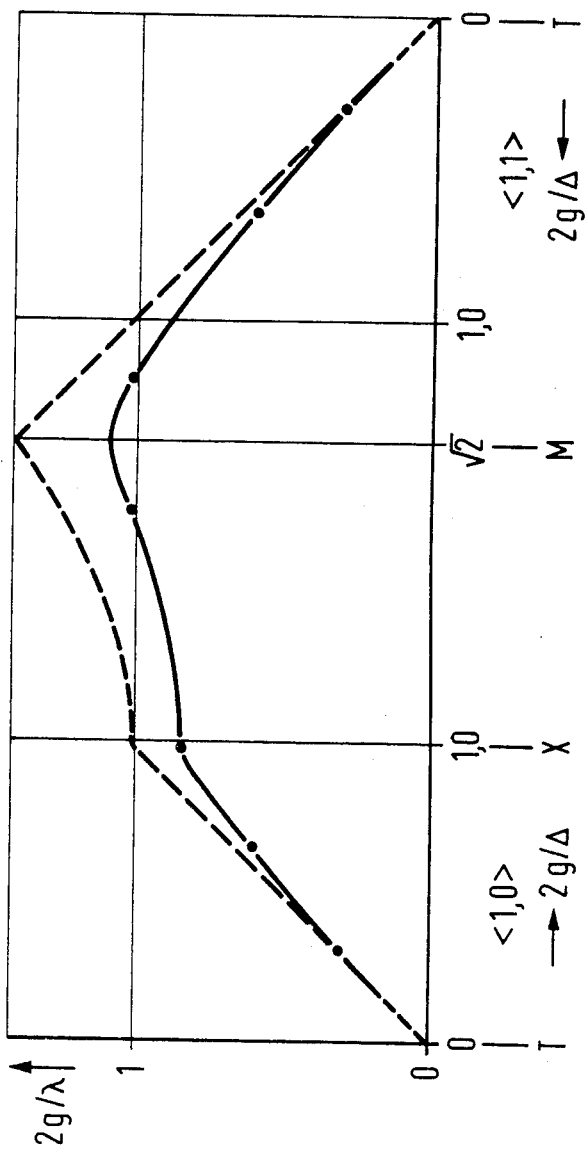

The dispersion $\omega(\vec{\beta})$ of the two-dimensional line in air is illustrated in FIGS. 2 and 3.

The components $\beta_x$ and $\beta_y$ of the propagation vector $\vec{\beta}_{00}$ of the fundamental wave are illustrated in FIG. 2 for various fixed ratios $\lambda/g$, plotted in a representational mode well known in solid state physics. Only the first Brillouin zone is pictured in FIG. 2. The dispersion in the higher zones, in which the higher partial waves lie, can be obtained by parallel displacement of the curves from the first zone. The curves were drawn through the measured points in the first octant and continued symmetrically in the other octants. All measurement points were measured with $\lambda = 337$ $\mu$m, but with doubly periodic gratings of differing grating constants: (a) 51 $\mu$m; (b) 102 $\mu$m; (c) 141 $\mu$m; (d) 169 $\mu$m. For the representation in FIG. 2, the propagation constants $\vec{\beta}_{00}$ were also normalized with the lattice constant g in each instance, corresponding to the data in square brackets. $\Lambda = 2\pi/|(\beta)|$ is the wavelength on the grating.

FIG. 3 shows the variation $\omega(\vec{\beta})$ in the principal-axis directions $<1,0>$ and $<1,1>$ in three sections through the first Brillouin zone. The same measurements as in FIG. 2 are illustrated. The plotting was again done in normalized form: abscissa $= 2g/\Lambda$ where $\Lambda =$ wavelength on the grating; ordinate $= 2g/\lambda$ with $\lambda =$ vacuum wavelength. For comparison, the dispersion of the vacuum is plotted in FIG. 3 by the dashed line. It is characteristic of the waveguide that its dispersion curve in FIG. 3 lies below that of the vacuum, i.e. in the range of so-called "nonradiating" surface waves.

EXAMPLES

Figure 4:
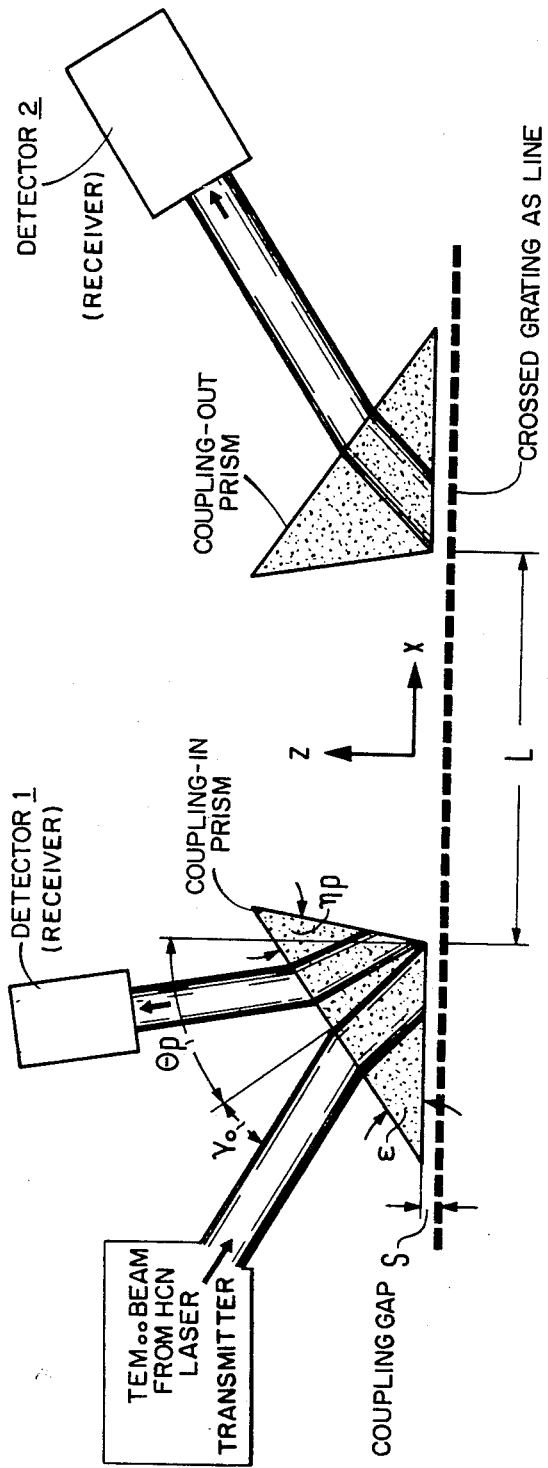
FIG. 4 is a side view of a second embodiment of the invention employing one or more specially arranged prism couplers in combination with the waveguide.

Waves of the described type were excited on a doubly periodic copper grating with grating constant $g = 141$ $\mu$m and thickness $t = 7$ $\mu$m and their propagation was measured. The frequency of the waves was 891 GHz, corresponding to the wavelength $\lambda = 337$ $\mu$m of an HCN laser. The excitation was effected by means of a prism coupler as in FIG. 4. The prism was made of polyethylene (refractive index 1.516, prism angle $\epsilon=35°$). From the theory of the coupler it is known that with a coupling gap S of uniform optimal thickness a maximum fraction of 80% of the incident wave energy can be coupled into the waveguide. However, a still higher degree of coupling is possible if the coupling gap S gradually increases along the x-direction to form a tapered gap. When the coupling angle $\theta_p$, the gap S and the x-position of the incident TEM$_{00}$ laser beam were chosen optimally in the experiment, the signal at detector 1 fell to less than 10% of its original value. Therefore, more than 90% of the energy of the incident laser waves were coupled onto the waveguide. A maximum signal appeared simultaneously at detector 2 under these optimal coupling conditions. It measures the energy that has been transmitted along the waveguide over the length L. The intensity of the light falling on detector 2 was measured as a function of the line length L. This yielded a waveguide damping of approximately 2 dB/cm at room temperature. These losses are substantially smaller at low temperatures, since the conductivity of copper increases with decreasing temperature.

The propagation constant $|\vec{\beta}_{00}|$ could be determined from the measurement of the coupling-in angle $\gamma_0$ and from the known data of the prism. The components $\beta_x$ and $\beta_y$ follow from the orientation $\alpha$ of the grating axes relative to the propagation direction as $\beta_x = |\beta_{00}|\cos\alpha$ and $\beta_y = |\beta_{00}|\sin\alpha$. The curves of FIGS. 2 and 3 could thus be determined by varying the angle $\alpha$. From the viewpoint of measuring technique, it would have been more satisfactory to measure all these curves on one grating. Instead of this, the experimentally simpler method of repeating the measurements at the same frequency but with gratings of different grating constants g was chosen.

ADDITIONAL EMBODIMENTS

The described waveguide can be modified in many ways to obtain special properties. Thus, the very thin, mechanically delicate crossed grating can be applied to a mechanically sturdier substrate, such as very thin sheets of high-strength plastics (e.g. Hostaphan, Mylar) or to bulk low-loss dielectrics such as polyethylene, quartz or silicon. However, in these instances the condition of Eq. (5) must be sharpened by inserting $\lambda/n_s$ there instead of $\lambda$, where $n_s$ is the refractive index of the substrate. It is even possible to use a metal substrate of good conductivity, since in that case the waveguide becomes a highly miniaturized version of a so-called "corrugated surface waveguide."

The waveguide can also have a one-dimensional construction. For that purpose, a narrow strip a few g wide can be cut out of a crossed grating parallel to one of the principal symmetry directions of the grating. Also, the metal sheet forming the grating can be perforated only one-dimensionally from the beginning, perhaps in the form of a series of periodically arranged holes.

Figure 1A:
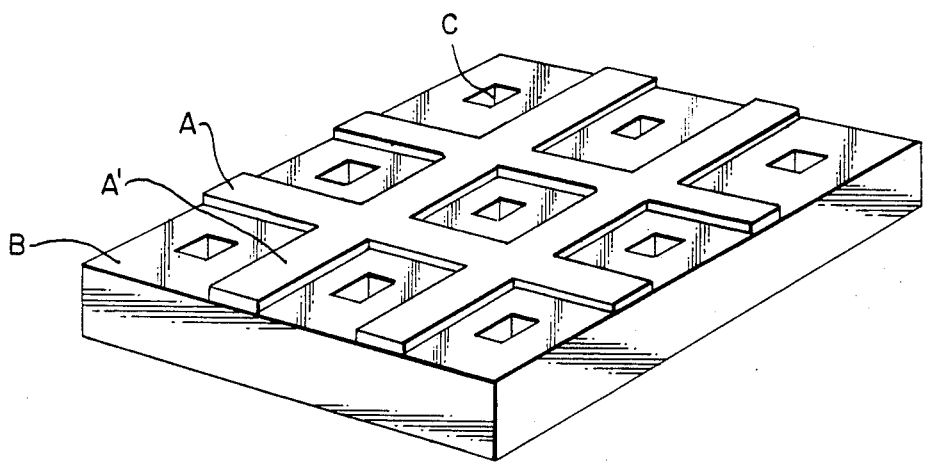
FIGS. 1A and 1B are similar perspective views of portions of a waveguide according to further embodiments of the invention.
Figure 1B:
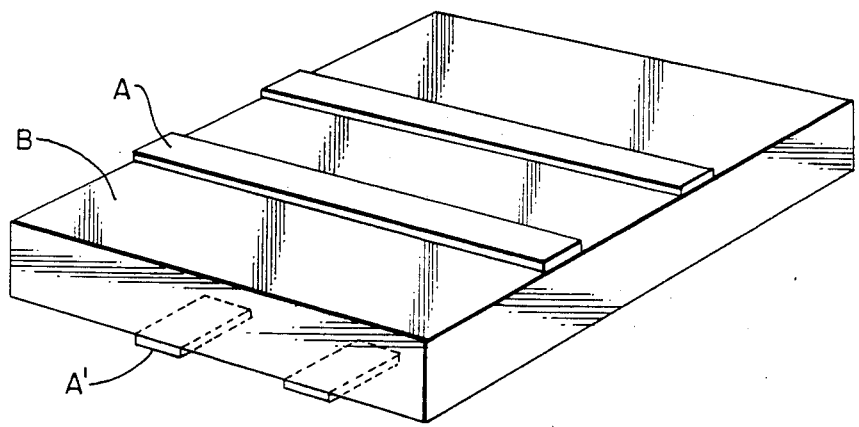

Other possible modifications of the grating profile consist of applying many small similar metallic or dielectric members in a regular singly- or doubly-periodic pattern on the surface of a metal sheet. In this case, if the metal sheet has no perforations, the guided wave travels only on that side of the sheet on which the members were applied. If such members are placed on both sides, then waves can also be guided on both sides, and indeed independently of each other. These further embodiments are illustrated in phase 1A and 1B where substrate members B, which may be integral or which may be unperforated or perforated, have doubly periodic arrangements of stripes A and A prime thereon with both sets of stripes being on one side of the substrate in FIG. 1A and the two sets of stripes being on opposite sides of the substrate in FIG. 1B. However, if there are regularly arranged perforations, then the field of a guided wave always extends on both sides of the sheet. FIG. 1A illustrates the above-mentioned case of doubly periodically arrayed perforations C in a dielectric substrate B having stripes A, A' of conductor on one or both face in grid array. Another modification possibility relates to the shape of the dispersion curve as is illustrated in FIG. 3. For some applications it is desirable to obtain a still stronger dispersion or even "critical points" in the interior of the Brillouin zone, at which the group velocity vanishes. Such dispersions can be achieved by increasing the grating thickness $t$ and also be varying the size and shape of the holes.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Waveguide for radiated electromagnetic waves in the submillimeter and infrared range, comprising means defining a waveguide surface for propagating a TM wave having an at least singly periodic two-dimensional sheet form grating made of electrically conducting material with at least a grating constant $$\left(\frac{1}{g_x^2} + \frac{1}{g_y^2}\right) > \left(\frac{2}{\lambda}\right)^2$$

where $\lambda$ is the wavelength of an electromagnetic wave of the radiated frequency propagating freely in the surrounding medium to be transmitted along the surface of the waveguide and $g_x$ and $g_y$ are finite grating constants of the grating defining finite periodicity in each of nonparallel x and y directions respectively, and means for directing a wave onto said waveguide surface such that a TM wave having said wavelength $\lambda$ is propagated along the surface of the waveguide.

2. Waveguide according to claim 1 wherein the grating is flat.

3. Waveguide according to claim 1 wherein the grating is an orthogonal grating.

4. Waveguide according to claim 1 wherein the grating constants $g_x$, $g_y$ associated with the two dimensions of the grating are different.

5. Waveguide according to claim 1 wherein the grating has a self-supporting construction.

6. Waveguide according to claim 1 wherein the grating is defined by a coating supported on a substrate.

7. Waveguide assembly, comprising in combination, the device according to claim 1 and further comprising a prism that faces toward the grating with a first face and that faces toward the wave transmitter or the wave receiver with a second face inclined at an angle to said first face, and wherein the grating is rotatable about an axis perpendicular to said first face to couple waves into and/or out of the device.

8. Assembly according to claim 7 and further comprising means defining a wave transmitter or receiver configured with respect to said prism as set forth in claim 10 and wherein the prism face that faces toward the waveguide includes with the grating an acute angle whose vertex lies on the side of the wave transmitter or wave receiver.

9. Waveguide according to claim 1 comprising multiple pieces defining the grating.

10. Waveguide according to claim 9 wherein the multiple pieces are on a common substrate.

11. Waveguide according to claim 10 wherein two sets of such multiple pieces forming a grating are applied on opposite sides of an essentially two dimensional substrate.

12. Waveguide according to claim 11 wherein the substrate is perforated.

13. Device for sending, carrying and receiving laser light having free space wavelengths ($\lambda$) of 0.001 –1 millimeter and comprising, means defining an at least singly periodic grating made of electrically conducting material for transmitting along the grating surface a TM wave, the grating having periodicity constants $g_x$, $g_y$ in nonparallel $x$ and $y$ directions in relation to the wavelength in accordance with the formula $$\left(\frac{1}{g_x^2} + \frac{1}{g_y^2}\right) > \left(\frac{2}{\lambda}\right)^2,$$

where $\lambda$ is the wavelength of a wave of the laser radiated frequency propagating freely in the surrounding medium to be transmitted along the surface of the waveguide and $g_x$ and $g_y$ are grating constants of the grating defining finite periodicity in each of nonparallel $x$ and $y$ directions respectively, means for directing laser energy into the grating such that a TM wave of said laser energy having said wavelength $\lambda$ is propagating along the surface of the waveguide and comprising a first prism which has a first face opposing the grating and a second face, at an acute angle to the first face, opposing a source of laser light, the vertex of the acute angle formed between said faces being disposed toward the source of laser light, means defining a second prism with a first face opposing the grating and a second face at an acute angle to the first face, means defining a laser wave receiver, said second face of said second prism opposing said laser receiver.

* * * * *